United States Patent
Hennings

[11] 3,712,740
[45] Jan. 23, 1973

[54] METHOD FOR THE AUTOMATIC ALIGNMENT OF TWO ARTICLES TO BE BROUGHT INTO REGISTER WITH ONE ANOTHER

[76] Inventor: Klaus Hennings, Reutlinger Strasse 25, Heilbronn, Germany

[22] Filed: April 20, 1970

[21] Appl. No.: 30,051

[30] Foreign Application Priority Data

April 19, 1969 Germany..................P 19 19 991.8

[52] U.S. Cl. ............356/152, 356/169, 356/166, 356/172, 250/219 DR
[51] Int. Cl. ..............................................G01b 11/26
[58] Field of Search............356/152, 169, 172, 166; 250/202, 211, 222, 220 M, 237, 219 DR; 350/81

[56] References Cited

UNITED STATES PATENTS

| 3,539,260 | 11/1970 | Burch | 356/172 |
|---|---|---|---|
| 3,029,348 | 4/1962 | Heinz | 250/220 M |
| 3,197,643 | 7/1965 | Morris | 356/152 |
| 3,488,104 | 1/1970 | Doherty | 350/81 |
| 3,542,469 | 11/1970 | Hennings | 356/172 |

FOREIGN PATENTS OR APPLICATIONS

| 1,233,150 | 1/1967 | Germany | 356/152 |

Primary Examiner—Benjamin A. Borchelt
Assistant Examiner—S. C. Buczinski
Attorney—Spencer & Kaye

[57] ABSTRACT

A method for the automatic alignment of two articles to be brought into register with one another comprises forming an associated register mark on each article, detecting the register marks associated with one another on both articles using a single optical measuring system, and aligning the articles as a result of the detection. The method may suitably be applied to sheets provided with structures therein, such as semiconductor wafers and masks.

34 Claims, 15 Drawing Figures

PATENTED JAN 23 1973

*Inventor:*
Klaus Hennings

BY *Spencer & Kaye*
ATTORNEYS.

Inventor:
Klaus Hennings

Inventor:
Klaus Hennings

METHOD FOR THE AUTOMATIC ALIGNMENT OF TWO ARTICLES TO BE BROUGHT INTO REGISTER WITH ONE ANOTHER

BACKGROUND OF THE INVENTION

The invention relates to a method for the automatic alignment of two articles to be brought into register with one another by means of photoelectric measuring instruments. Such articles may, for example, be sheets provided with structures.

In the semiconductor art, and in many other applications, for example, during the manufacture of structured sheets for scales, the problem arises of bringing two structured sheets into register with one another with great accuracy. It may, for example, be a question of two substrate sheets, of which at least one is transparent, and both of which bear a pattern on one surface. The two substrate sheets are placed one on top of the other, with or without an air gap, so that the patterns are adjacent to one another. In known devices and methods of registering, the patterns are observed with a microscope, with transmitted light or incident light, through the transparent substrate sheet or sheets, and are aligned in relation to one another in a plane perpendicular to the axis of the microscope. In known devices, this alignment may be effected, for example, by means of a micromanipulator. In another known method of registering, the two sheets provided with structures are spatially separated from one another and are reproduced one on the other by means of an optical system. In this case, either the one pattern may be reproduced on the other, or both patterns may be reproduced in a third plane, and the reproduction and observation may be effected with illumination either by incident light or by transmitted light. In the commonest case, the two structured sheets, which are spatially separated from one another, are on parts which have to be brought into a defined position in relation to one another. In this case, the two structured sheets only serve as aids for the alignment of the parts carrying them. This method is used for example in interferometric arrangements.

In the semiconductor art, a second pattern contained in a mask generally has to be reproduced on a semiconductor wafer, which already carries a first pattern on its surface and is coated there with a light-sensitive lacquer in a position in precise register with the first patter. In the simplest case, in a known method, the mask pattern is transferred to the semiconductor wafer by contact printing. In order to align the patterns in relation to one another, an air gap of a few $\mu$m is set between the semiconductor wafer and the mask, each with their patterns adjacent to one another. The structures on the two sheets are observed with incident light illumination through the transparent substrate of the mask by means of a microscope, and are aligned in relation to one another by displacement of mask or semiconductor wafer. The depth of focus is preferably selected greater than the air gap between mask and semiconductor wafer in order that both patterns may appear sharp at the same time. With very small structures and the powerful microscope enlargement necessary in this case, the depth of focus may, however, be even less than the smallest air gap which can still be set. In this case, it is also possible first to focus on the semiconductor wafer and to align this in relation to a hairline cross or an equivalent optical formation in the microscope, and then to effect a likewise alignment with the mask. A mask and semiconductor wafer are also aligned in relation to one another by this means.

In another known method, however, the mask pattern may be transferred to the semiconductor wafer by projection by means of a high-resolution objective. In this case, the mask pattern is projected onto the semiconductor wafer for the transfer of the pattern. In order to align the patterns in relation to one another, the pattern projected onto the semiconductor wafer and the pattern on the semiconductor wafer may be observed directly or indirectly after reproduction in a reflected image plane by means of the projection objective. Since this method involves disadvantages, the pattern of the semiconductor wafer may appropriately be reproduced again in the plane of the mask in the reverse path of projection rays, and the two patterns observed in the mask plane.

Normally, for the mutual alignment of the patterns, either lines in both patterns are registered one above the other, or a circle is aligned in a square for example, or a smaller square is aligned in a larger square. It is also possible, however, to align two register marks, which are situated side by side with defined spacing when the alignment between mask and semiconductor wafer is precise, in relation to two marks situated side by side with corresponding spacing in the register microscope, or to work with two separate microscopes each of which has a built-in mark and which are at a defined distance apart.

Hitherto, the alignment of sheets in relation to one another as described has always been carried out by visual observation and manual displacement. Fully automatic alignment of the patterns is, however, possible by means of the so-called photoelectric measuring microscopes which have been developed in recent times. The basic principle of the photoelectric measuring microscope consists in that a mark on a sheet within the range of perception of the microscope produces a signal with the correct sign, which is proportional or at least correlated to the linear distance from the optical axis of the measuring system. It is possible, by means of a regulating device, to bring the sheet into a defined position determined by the optical axis of the measuring system.

This may be effected, for example, by the image field of the measuring system being reproduced on an enlarged scale on a plane containing the roof edge of a mirrored prism. The prism divides the total light flux into a competent portion at each side of the roof edge and conveys each of the two components to a sensor. With uniform illumination, the difference between the two luminous fluxes disappears when the mark on the sheet is reproduced symmetrically on the roof edge. On deflection of the mark, the difference in the luminous fluxes forms the required signal which indicates the position of the lines sheet in relation to the position when the signal disappears, and is used for its control. It is also possible to displace the prism in the image plane perpendicular to the roof edge and to adjust the position of the line mark by means of a follow-up device. In this case, the required signal for the control of the sheet to be adjusted is derived from the follow-up control of the prism. The prism may also execute an oscillating motion in the direction indicated, as a result of which alternating light signals result instead of direct light signals. The prism follow-up may be superimposed on this oscillating motion.

The prism has been selected here as an example, for a simple explanation. It may be replaced by other arrangements such as fixed or oscillating diaphragms for example.

It is common to all the systems described that the signal is associated with a linear deflection in a predetermined direction. In order to locate or align a graticule in a plane, three quantities are needed, namely $x$, $y$ and $\psi$, and accordingly three linear measuring systems $Mx$, $My$, $M\psi$. In order to align a further graticule in relation to the first, three further measuring systems $Sx$, $Sy$, $S\psi$ are needed which are in a fixed positional relationship $\Delta x$, $\Delta y$, $\Delta \psi$ to the first three systems. Altogether, therefore, a combination of six linear measuring systems are needed for known methods.

First of all, therefore, the first sheet is aligned in relation to the measuring system or in relation to the measuring-system combination, and then the second sheet is likewise aligned in relation to the measuring system, as a result of which alignment of the sheets in relation to one another is obtained.

SUMMARY OF THE INVENTION

It is an object of the invention to provide a method whereby the alignment in relation to one another of two sheets provided with structures is possible with only three or even with only two measuring systems instead of six systems.

According to the invention, there is provided a method for the automatic alignment of two articles to be brought into register with one another comprising the steps of forming an associated register mark on each article, detecting the register marks associated with one another on both said articles by means of a single optical measuring system, and altering the position of one said articles with respect to the other said article in response to the output of said optical measuring system.

Further according to the invention, there is provided a method for the automatic alignment of two sheets provided with structures to be brought into register with one another comprising the steps of forming an associated register mark on each sheet, detecting the register marks associated with one another on both said sheets by means of a single optical measuring system including photoelectric means, and altering the position of one said sheet with respect to the other said sheet in response to the output of said photoelectric means.

Still further according to the invention, there is provided a method for the automatic alignment of a semiconductor wafer which is provided with structures on the surface and a mask to be brought into register with one another, comprising the steps of forming an associated register mark on the semiconductor wafer and the mask, detecting the register marks associated with one another on said semiconductor wafer and said mask by means of a single optical measuring system including photo-electric means and altering the relative position of said semiconductor wafer and said mask in response to the output of said photoelectric means.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

In accordance with the invention, the associated register marks on both articles are detected by means of a single optical measuring system and are aligned in relation to one another.

By this method, the number of measuring systems may first be reduced to one for each of the three register coordinates $x$, $y$, $\psi$, if it is assured that the registering operations between the two lined sheets in relation to the measuring system do not influence one another or that they only influence each other to an insignificant extent. In the method according to the invention, register marks on the sheets to be brought into register with one another are reproduced on the entry plane of a reference system of a photoelectric measuring device which consists of mirror or diaphragm arrangements. In the course of the registration, a signal is produced which corresponds to the relative position of the register marks in relation to a reference axis or to a reference plane of the reference system. This signal in turn controls a regulating device. The sheets to be adjusted in relation to one another are preferably aligned in relation to one another in the direction of the defined cartesian coordinates $x$ and $y$ and of the angle of rotation $\psi$. Accordingly, there is at least one register mark for each of these three directions on each sheet.

In one embodiment of the method according to the present invention, two register marks associated with one another and on the two plates to be aligned are reproduced simultaneously or successively on the same reference system of the photoelectric measuring device and aligned in relation to its reference axis or plane. Various methodsmay be used for achieving this result. For example, it is possible for both plates to be moved in relation to a stationary photoelectric measuring device in accordance with the signal supplied by the photoelectric measuring system with the alignment of the associated register marks on both sheets being reproduced simultaneously on the reference axis of reference plane of the reference system in the desired aligned position, with incident light illumination.

There is the further possibility of displacing the photoelectric measuring device or the reference system in the photoelectric measuring device by a certain distance s after aligning the first sheet in relation to the measuring device and then aligning the second sheet in relation to the measuring device. The distance s must then be taken into consideration when selecting the position of the associated register marks on the two sheets so that the two sheets are also aligned in relation to one another after the two individual alignment operations.

In a modified embodiment, there is the possibility of one of each of the two associated register marks on the two sheets being reproduced on one of two reference systems situated optically side by side by the distance s in the same photoelectric measuring device and being aligned in relation to its reference planes or axes. Then, too, the distance $s$ must be taken into consideration when selecting the position of the associated register marks on the two sheets so that the two sheets are aligned in relation to one another after the individual alignment operations. The distance $s$ is preferably selected so great that the two register marks on the two plates do not influence one another during the alignment operations. Mutual influencing of the two register marks can be eliminated, however, for example by repeated alternate alignment of the two register marks.

In an advantageous further development, two different wavelengths of light or ranges of wavelength are used for the reproduction of the register marks on the reference system or systems in the photoelectric measuring device, for the alignment of two associated register marks on the two sheets.

Figure 1:
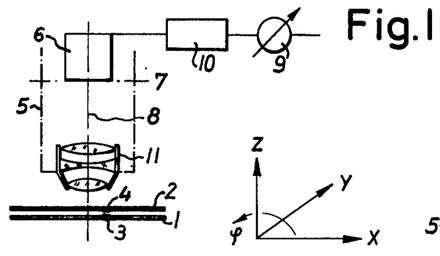
FIG. 1 shows diagrammatically an automatic registering device in accordance with one embodiment of the invention with a stationary measuring system.

Referring now to the drawings, FIG. 1 illustrates a registering device which functions fully automatically. Each of the two sheets 1 and 2 to be brought into register with one another comprises at least one register mark 3 and 4 for each of the three coordinates. The register mark on one sheet are associated with the corresponding register marks on the other sheet. The photoelectric measuring device 5 — hereinafter abbreviated as LEM — contains a reference system 6 in the form of mirror or diaphragm arrangements on its entry plane 7. In the case where a prismatic mirror is used, the plane 7 is the plane in which the prism edge lies. The register marks on the sheets are reproduced on the plane 7 and as a result a signal 9 is produced. This signal corresponds to the relative position of the register marks 3 and 4 in relation to the reference axis or reference plane 8 of the reference system 6. The signal is obtained by means of an electronic system 10 from the sensor or sensors located within the reference system 6. The signal possibly after suitable conversion, can then be used directly or indirectly to guide the sheets which are to be brought into register with one another into their desired position.

In the embodiment illustrated in FIG. 1, the associated register marks on the two sheets are reproduced simultaneously or in succession on the same plane 7 of the reference system 6 of the LEM 5 (photoelectric measuring device) and are aligned in relation to the reference axis of plane 8. In the event of simultaneous reproduction of both marks on the reference system, a separation of the two items of information may be effected and hence mutual influencing be prohibited or at least rendered negligible, by using different wavelengths of light or alternating light at different frequencies for the reproduction of the two marks. If the marks are reproduced in succession on the reference system, mutual influencing may also be avoided by alternately switching on the illumination for the one sheet or the other 1 or 2, or by interposing diaphragms between the sheets, or by deflecting one sheet or its register mark out of the image field of the LEM, by a special selection of the configuration of the register marks, or by a plurality of these means.

In all these cases, the LEM is mounted stationary and the sheets to be aligned in relation to one another are displaced in relation thereto. The two register marks are reproduced one on top of the other with the illumination switched on or the diaphragm swung out of the way.

In a modified method, the two register marks are situated side by side by the amount $s$ in the aligned state. As FIG. 2 shows, the reproduction on the same reference system 6 comes about as a result of the fact that the entire LEM 5, for example, is displaced precisely by the amount $s$ between the alignment of the first lined plate and of the second lined plate.

Figure 3:
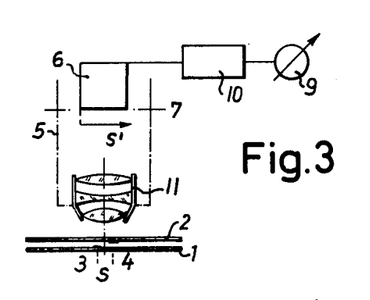
FIG. 3 shows diagrammatically a device similar to FIG. 1 but having a moving reference plane.

According to FIG. 3, however, only the reference system 6 within the LEM can be displaced by this amount or by an analogue amount $s'$ varied by the aperatus constant.

Figure 4:
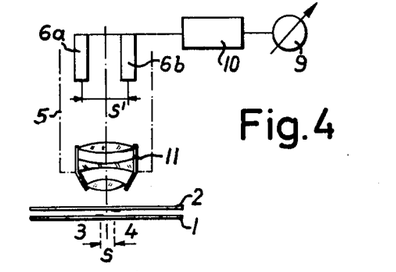
FIG. 4 shows diagrammatically a device having a dual photoelectric cell measuring system.

Finally, as FIG. 4 shows, it is also possible to provide two reference systems 6a and 6b, which are offset by the amount $s'$, in a LEM 5 with an objective 11. In this latter case, a register mark 3 is reproduced on the reference system 6b, for example, while the register mark 4 is reproduced on the reference system 6a. The two register marks are then aligned in relation to one another.

Figure 2:
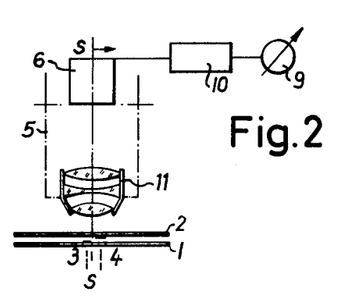
FIG. 2 shows diagrammatically a device similar to FIG. 1 but having a moving measuring system.

In comparison with the use of two separate LEMs per coordinate, — that is, two LEMs for each $x$, $y$, $\psi$ coordinate, or a total of six, — the method as shown in FIGS. 2 to 4 has the great advantage that the two register marks associated with one another can be applied relatively close beside one another and so the space requirements for the alignment are considerably less. In this case, if one register mark comes into the image field of the other mark, in the event of extreme deviation from the desired position, the resulting error in register can be eliminated, at least with non-oscillating measuring devices, by means of repeated alternate registering of the two lined sheets. During the first registration, the two marks are aligned to such an extent that they no longer influence one another, the second registration is then precise.

Hereinafter, the advantageous forms of construction with a static arrangement of the LEM and simultaneous or successive reproduction of both register marks on the same reference system will be explained in more detail. Here, the space requirements for the register marks are even less than in the arrangements shown in FIGS. 2 to 4 because the associated register marks are situated directly one above the other. In principle, a distinction should be made between three cases;

1. The two associated register marks are reproduced in succession on the reference system and each brought into register.
2. The two marks are reproduced simultaneously on the reference system but brought into register in succession and
3. The two marks are reproduced and brought into register simultaneously.

The first case can be realized by using different light sources and illuminating beams for the two sheets. If the beams to be reproduced are independent of one another, it is sufficient to switch on the light sources alternately. If the two lined sheets are reproduced one on top of the other, however, — as with contact printing (FIG. 5) and the projection method (FIG. 6) — mutual influencing must be eliminated by separate means. In both cases, the observation and alignment normally takes place through the one sheet 2, which is usually designated as a mask.

Figure 5:
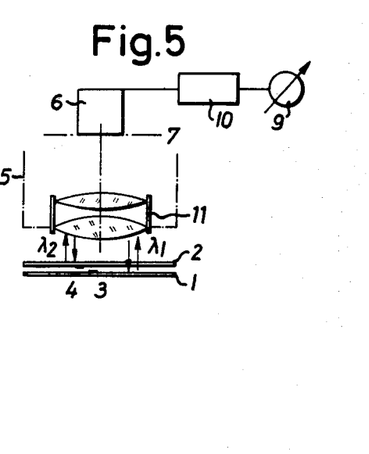
FIG. 5 shows diagrammatically an automatic registering device for contact printing, for example, a mask onto a semiconductor wafer.
Figure 6:
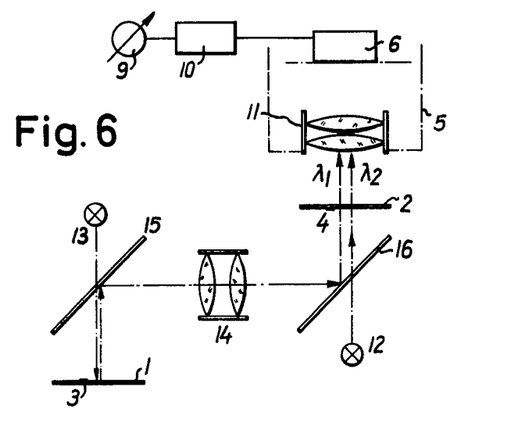
FIG. 6 shows diagrammatically an automatic registering device for projection printing of, for example, a mask on to a semiconductor wafer.

In the contact printing of FIG. 5, the illuminating and image-forming path of rays for both lined sheets are identical, with the projection method as shown in FIG. 6, the rays may be separated from one another into the paths of rays 12 and 13. With projection, a single reproduction of the mask 2 on the reference system is possible, for example, by means of transmitted-light illumination 12 through the semi-transparent mirror 16. Alternatively, a semi-transparent mirror and/or the projection optical system can be used. The sheet 1 is suitably illuminated by incident light. A single reproduction of the mask 2 may be effected, in both cases, by means of incident-light illumination if the sheet 1 is removed or covered by a diaphragm. This diaphragm should be constructed in the form of a black or reflecting surface depending on the nature of the register mark in the mask. A single reproduction of the sheet 1 is possible if the mask 2 is swung out of the way. With contact printing in particular, but also with the projection method, it may be a great advantage to align the mask in relation to the LEM before the semiconductor wafer is brought into its position below the mask, or conversely to align the semiconductor wafer in relation to the LEM before the mask is brought into its position above the semiconductor wafer.

Swinging aside involves an expenditure of mechanical energy, however, It is therefore further proposed that different wavelengths of light should be used for the two registering operations, as shown in FIGS. 5 and 6. The mask 2 and its register mark are produced from a material which has a high transmission in a specific range of wavelengths $\lambda_1$. The reproduction of the lined plate 1 is then effected through the mask 2 with light from the range of wavelength $\lambda_1$. The register mark on the lined plate 1 is so constructed that it provides as high a contrast as possible with this wavelength. The single reproduction of the mask 2 is effected, during projection, for example, with transmitted light 12 having a different wavelength $\lambda_2$. The on the lined plate 2 is so constructed that it too register mark provides a high contrast with this wavelength. The illumination of the mask 2 may, however, also be effected by means of incident light. It is then proposed that the lined sheet 1 should be covered by a diaphragm, or the wavelength $\lambda_2$ and the reflection of the register mark from the lined plate 1 be so selected that only a low contrast image thereof is formed. Semi-transparent mirrors 15 and 16 and an image-forming objective 14 are necessary for the projection image-forming.

In determining the spectral transmission of the mask, however, the fact must be taken into consideration that, during the subsequent transfer of its pattern to the sheet 1, which consists of a semiconductor wafer for example, the mask 2 must provide a high contrast. It is therefore proposed that the register pattern and the other structures of the mask 2 should be provided in the form of a thin absorbing film layer, for example ZnSe, CdS, GaP, a photographic emulsion, a photolacquer, a metal, or a compound having a special spectral transmission, on a glass substrate. This layer film layer which contains the register marks is in the form of positive a or negative, apart from other structures provided for the masking of the semiconductor surface. These materials form a low-pass filter with an absorption range or edge in the region of about 500 nm. For shorter wavelengths, there is therefore a higher contrast and for longer wavelengths a lower contrast. The transfer of the pattern and the alignment of the mask 2 in relation to the photoelectric measuring device 5 is then effected by means of wavelengths which are less than 500 nm. The alignment of the lined sheet 1 is effected by means of a wavelength which is greater than 500 nm. During the alignment of the mask 2, care should be taken to ensure that the photolacquer on the sheet 1, which consists of a semiconductor wafer for example, is not pre-exposed.

The same sensors may be used for the alignment of both register marks with the method indicated previously, these sensors being sensitive to both wavelengths used. It has also proved advantageous, however, to use a filter in front of the sensors which are suitable for their particular wavelength for each of the two register marks.

It is naturally also possible to illuminate mask and/or sheet having structured surfaces with white light and to select the range of wavelength required for the reproduction by interposing appropriate filters in front of the sensors.

With the use of two wavelengths as described, the successive reproduction of the two register marks is no longer strictly adhered to because compromises always have to be reached in determining the spectral reflection or transmission of the register marks. A low-contrast image of the other mark is therefore generally superimposed on the required image. It is possible, however, to use reference systems wherein a register mark which has already been aligned has only an insignificant influence on the alignment of a further register mark on the same reference system.

Figure 7:
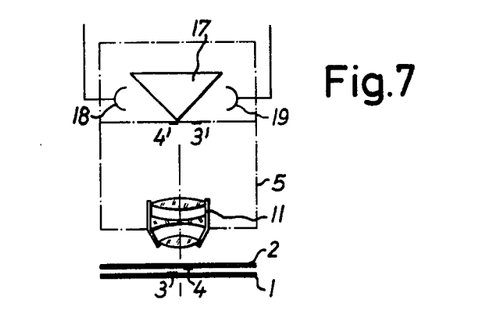
FIG. 7 shows diagrammatically an automatic registering device having a beam splitting arrangement and two photoelectric devices in the measuring system.
Figure 8:
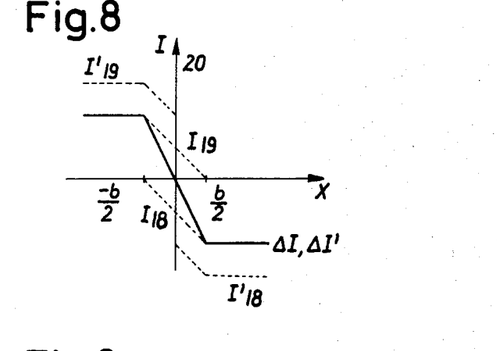
FIG. 8 is a graphical representation of the current in the two photoelectric devices of FIG. 7 with luminous line register marks.

As an example, the system may be mentioned wherein the register mark is reproduced on the prism edge of a mirrored prism 17 illustrated in FIG. 7. In general, it is assumed that means for dividing the light flux are provided in the plane on which the image field of the measuring system is reproduced, and that furthermore two sensors are present, with some of the light flux being incident on each. In the special case which is illustrated in FIG. 7, the prism edge of a prism 17 is used to divide the light flux. When the mark 4 is aligned in the example illustrated in FIG. 7, its image 4' lies symmetrically in relation to the prism edge so that both sensors 18 and 19 receive the same luminous flux. In this state, it is possible to align a second mark 3 with the image 3' on the same reference system with the same photoelectric measuring device, because the influence of the first mark is eliminated when the luminous flux is split for the difference distribution to the sensors 18 and 19. If the images of the two register marks on the reference system are luminous lines, the behavior of the current in the two sensors is as plotted in FIG. 8. Here, $b$ indicates the width of the luminous register mark. The difference current is $\Delta I$ for the first and second registration. The individual currents in the first registration are $I_{18}$ and $I_{19}$ while, those in the second registration are $I'_{18}$ and $I'_{19}$.

This method may be used in FIGS. 5 and 6, for example, by first aligning the mask 2 in a single reproduction with the wavelength associated therewith, with high contrast. The register pattern consists, in this case of an area of ZnSe, for example, with a slit diaphragm (aperture) of the width $b$. Then the register pattern of the lined sheet 1 is reproduced in the form of a luminous strip on the reference system through the layer of ZnSe by means of the associated wavelength, and is aligned. A low-contrast image of the ZnSe slit is then superimposed on this registering operation and a similar current behavior develops to that illustrated in FIG. 8.

Figure 9:
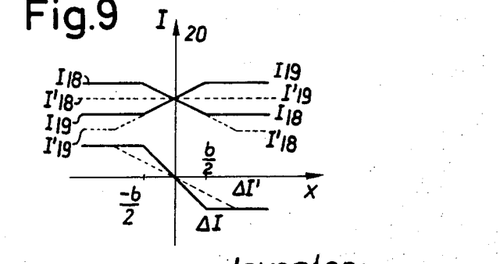
FIG. 9 is a graphical representation of the current in the two photoelectric devices of FIG. 7 with luminous field register marks.

The method may also be used if the mask 2 is not semi-transparent, that is to say if its mark is non-transmissive to the wavelength $\lambda_2$ (FIG. 5). In this case, however, a bright-field mark (dark line in a light field) must be used instead of the dark-field register mark (luminous line in a dark field). FIG. 9 shows the corresponding behavior of the currents in this case. $\Delta I$, $I_{18}$ and $I_{19}$ are the currents for the registration of the first mark which is reproduced along on the reference system. In the registered position, the central region of the register mark is covered to the width b by this mark. Accordingly the current $\Delta I'$, $I'_{18}$ and $I'_{19}$ result during the registration of the second mark. If the register mark on the mask 2 is also semi-transparent, the sensitivity of the second registration is increased somewhat.

Attention may be drawn at this point to the fact that it is also possible in principle to provide one lined sheet with a bright-field mark and the other with a dark-field mark. It is further possible to give the two marks different configurations, for example different line widths. In the case of FIg. 9, for example, an increase in the sensitivity of the second alignment can be achieved if the extent of the first register mark to be aligned is selected less, in the direction of the registration movement, than that of the other register mark. The line width of the first register mark to be aligned is preferably selected thinner than that of the other register mark.

Figure 10:
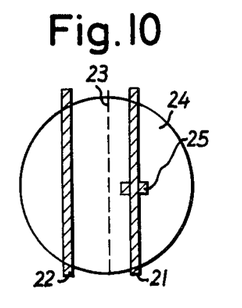
FIG. 10 shows the position of two register marks in the measuring field of the measuring arrangements before alignment takes place.
Figure 11:
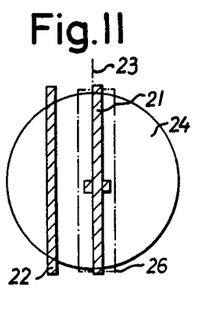
FIG. 11 is a view similar to FIG. 10, but showing the initial alignment of one register mark.

The general case of constant simultaneous reproduction of both marks on the reference system will now be examined. It occurs, in particular, in FIG. 5 when no diaphragm is interposed between lined sheet 1 and mask 2, and in FIG. 6 when only one illuminating beam is used. The possibility must be considered that initially one mark will be situated at each side of the desired position 23 (FIG. 10) and no adequate signal results with the same or similar register marks. It is therefore proposed that the first mark 21 to be brought into register should be so constructed that it produces a greater signal than the second 22, for example as a result of different contrast or different configuration. In particular, it is proposed that the extent in area of the first mark should be made greater than that of the second, e.g., of greater longitudinal extent in the direction of register movement. With the long, narrow lines used for preference — for example longer than the diameter 24 of the image field or the range of perception — the line width of the first line 21 may be made broader than that of the second for example, or weight per unit area may be applied in the form of a short crossbar 28 on the line. In both cases, the signal disappears and the first alignment is terminated before the line 21 is precisely brought into line with the desired position 23 because the signal of the other mark 22 is superimposed (FIG. 11). It is therefore further proposed that after the first registering operation, an auxiliary mask should be brought in front of the reference system to restrict the image field or the measuring area to the small region 26 about the desired position 23. The first registering operation is now repeated and a precise alignment of the mark 21 achieved because the signal of the mark 22 is eliminated. The alignment of the second mark 22 is then effected without the auxiliary mask with a full field of view.

Finally, as the optimum solution for simultaneous reproduction of both lined sheets on the reference system, it is proposed that both sheets should be illuminated by different light sources having different wavelengths — for example 12, 13 as shown in FIG. 6. By interposing appropriate filters in front of the reference system or in front of the sensors, it is then possible, for the alignment of one mark, to reproduce this alone on the reference system. The spectral reflection or transmission of the marks may have to be adjusted accordingly. Thus the two alignment operations are independent of one another.

This offers the further possibility of executing both alignment operations simultaneously by introducing beam splitters behind the reference system to divide the luminous flux between two sensors at a time. The spectral sensitivity of these two sensors is selected — possibly by means of filters — so that each sensor is sensitive to one of the two marks. An electronic system is then naturally necessary for each pair of sensors having the same wavelength.

The register marks on the sheets may generally consist of thin films on a substrate or of relief structures in the substrate surface. They may consist of vapor deposited metal film pattern or of etched figures applied to a sheet (e.g., conductor body) before or between various successive processing operations therein. They may be illuminated by incident light or transmitted light, consisting of amplitude- (light-dark) phase structures, and form bright-field or dark-field marks (brightness in the surrounding field). Specific examples, with transmitted light, are structures of metal or other absorbing films and, of course, photographic emulsions, or structures etched into the substrate surface and possibly inked on the substrate surface. In principle, the same structures are suitable for incident-light illumination if care is taken to ensure that they provide a high reflection contrast. In general, this means that the structure should be highly reflecting — for example a silver film — if the substrate surface is a poor reflector, or the structure should have a low reflection factor — for example a dark (reflection-reduced) layer of chromium or graphite — if the substrate has a high reflection factor. In particular, with register marks which consist of relief or thickness structures, the dark-field illumination may be used to advantage in order to produce dark-field marks with high contrast.

In order to be able to obtain a high contrast even when the possibilities described cannot be used, it is proposed in a further development of the invention that the register marks should be constructed in the form of a thickness structure of thin films which provide an interference contrast image as a result of thickness interference in monochromatic or narrow-band light. Materials which may be considered include, for example, Si oxide and nitride, many other metal oxides and also photolacquers. The films may be used both with transmitted light or with incident light on a reflecting substrate.

A special application is the semiconductor wafer. It is generally covered with an insulating layer of Si oxide in the planar process. The register mark can therefore here be produced by apertures or differences in height being formed in this covering layer. In the case of apertures which extend to the highly reflecting surface of the semiconductor, the interference order to the layer must be adjusted by means of the layer thickness or the wavelength so that the reflection at the layer is at a minimum. If the structure is formed by a thickness step, the height of step must be an odd multiple of $\lambda_{s/4}$ ($\lambda_s$ = wavelength in the layer).

Thus steps or windows in the insulating layer steps or regions of different reflection of the semiconductor surface may be used.

The interference arrangement of the whole layer thickness is selected according to whether a bright-field mark or a dark-field mark is required.

In the semiconductor manufacturing process, the complication arises that the thickness of the covering layer cannot be selected arbitrarily and, in addition, may vary during the manufacturing process, between two successive masking processes. The same applies to the total thickness as well as to the step height. It is therefore further proposed that the register pattern should be constructed in the form of a very narrow line which is only just resolved by the optical measuring system. The interference arrangement of the surrounding area of constant layer thickness is now adjusted to minimum reflection by means of the illumination wavelength (dark field). The narrow line or the step at its edges must now produce brightening in any case, which is detected by the LEM. If the step height amounts to $\lambda_l/2$ or a multiple thereof, the line itself appears dark and a bright double line appears in front of the two edges. The line width of the register mark must therefore be made so narrow that the LEM does not resolve the edges as individual lines but only records their intensity sum. If this intensity sum or the resulting line width is too low, it is further proposed that the register marks should be composed of a plurality of parallel narrow lines which appear as one line to the LEM. A practical example is a register mark which consists of two to three lines of the width of about $2\mu$ with a spacing of $2\mu$.

A simular effect can be achieved with the same register marks if, instead of the interference contrast method, a conventional dark-field illumination is used. In this case, too, the two edges of the narrow line appear bright in the dark surrounding field. The dark-field illumination is particularly to be preferred when a narrow-band illumination cannot be used in order to achieve an adequate interference contrast, or the adjustment of the interference arrangement to light and dark surrounding field is too complicated.

Finally, as a further example of a register mark on a semiconductor wafer, it is proposed that register marks should be provided as narrow lines in the form of a thin metal film before the beginning of the semiconductor process. This metal film — for example of Mo, Ta Cr, Ti, Au or Al — should prevent the formation of an oxide layer in the region of the register mark during the following oxidation and diffusion processes and should retain its own reflection as far as possible. In this manner, it is possible to ensure that the register mark always appears in the form of a bright line in a dark field provided the interference arrangement in the surrounding field is adjusted to a minimum reflection by means of the wavelength as described above.

In order to adjust the minimum reflection in the surrounding field (dark field), it is further proposed that white light or a light having a sufficiently broad range of wavelength should be used for the illumination and the wavelength should be adjusted, by means of a variable density filter at a suitable point in the path of rays so that the surrounding field appears with a minimum brightness. The sum of the luminous fluxes from the sensors or the integral brightness falling on the reference system may be used for this adjustment. It is therefore further proposed that the variable density filter should be controlled, in a regulating circuit, by means of this integral brightness so that an intensity minimum appears. This arrangment can also be used for a bright field if it is regulated so that an intensity maximum appears. This adjustment may be carried out automatically before each alignment process for a semiconductor wafer. The proposals relating to the interference contrast register marks and the automatic contrast adjustment naturally likewise apply accordingly to bright field register marks, (intensity maximum in surrounding field).

Figure 12:
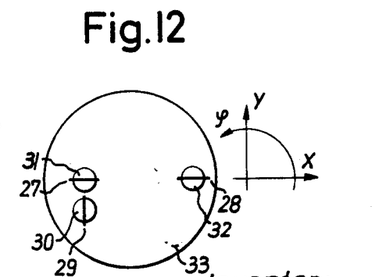
FIG. 12 shows a particular arrangement of register marks.

The register marks and reference systems hitherto discussed are each designed for the alignment in one direction. For the alignment in $x$, $y$ and $\psi$, therefore, three of these register marks and reference systems are necessary. FIG. 12 shows the arrangement of the three marks on the lined sheets 1, 2 or on the semiconductor wafer 33 or the mask. The marks 27 for the $y$-alignment and 28 for the $\psi$-alignment are at widely separated points. The lines 29 disposed perpendicular thereto for the $x$-alignment may be disposed in the vicinity of one of the other two marks 27, 28. Each mark, or each pair of marks, from mask and semiconductor wafer is detected by a LEM with the image fields 31, 32, 30. It is therefore proposed that the length of the register marks should be greater — specifically twice as great — as the diameter of the image field, in order to ensure reliable alignment, for example in the $x$-direction, even when the $y$-direction still has a great deviation from its desired position.

The field surrounding the register marks must be free of other structures in order to eliminate influence on the alignment. Each register mark therefore means a loss of active area on the semiconductor wafer. It is therefore further proposed that the two register marks for the $x$ and $y$ alignment should be placed one above the other in the form of a crossed line arrangement. Mutual influencing of the two register marks or pairs does not occur in this case because the intensity of the $x$ mark for example remains constant during the measurement of the luminous fluxes for the $y$-alignment and is emphasized so long as the lines project beyond the image field at each side. The alignment in both directions can be effected by means of a single LEM by turning the LEM or the reference system of the LEM through 90°. In both positions, the reference system only responds to the pair of register marks lying in this direction. Thus the expenditure for the alignment of two lined sheets in relation to one another is reduced to two LEMs.

In a further development, it is proposed, instead of turning the measuring system through 90°, to use a cross system which divides the field of view not into two semicircles but into four quadrants each with a sensor. A diaphragm arrangement or the prismatic mirror arrangement shown by way of example in FIG. 7 and be used with prismatic mirror arrangement, this mirror arrangement with the apex in the entry plane 7. The arrangement shown in the plane of the paper is therefore repeated in the plane perpendicular to the plane of the paper. In order to avoid errors as a result of the limited depth of focus of the reproduction on the entry plane, it is further proposed that the apex of the pyramid should be made truncated and so the luminous flux deflected through about 150° instead of about 90°. Only the sensors are now switched over in pairs order to change the direction of registration. For alignment in the $x$-direction with the $x$ line situated in the $y$-direction, therefore, the sensors situated in the positive $x$-direction for example are connected together to form the difference with the two sensors in the negative direction. Simultaneous alignment in both directions can, however, be achieved by means of a suitable electrical circuit.

The signals for $x$-alignment and $y$-alignment are passed to servo-actuators which cause a linear $x$-motion or $y$-motion, whereas the $\psi$-signal controls a rotation of the lined sheet. The point of rotation may, in principle, be situated anywhere so long as it is closer to the $y$-mark than to the $\psi$-mark. In order simplify the alignment, however, it is proposed that it should be situated in the $y$-mark and particularly at the point of intersection with the $x$-mark.

Thus it has been found that one photo-electric measuring device can be used for the alignment of two lined sheets in the direction of each of the three coordinates $x$, $y$ and $\psi$. Furthermore, however, it has been possible to prove that, apart from the two associated register marks of one coordinate on the two sheets, two further associated register marks for another coordinate can be detected and aligned in relation to one another by means of the same optical measuring system. In the latter case it has proved advantageous for the alignment in the direction of the three coordinated $x$, $y$ and $\psi$, to use a two coordinate system for $x$ and $y$ and a single-coordinate system for $\psi$. In this case, it is further proposed that the single-coordinate system should preferably be combined with one coordinate of the two-coordinated system with respect to the reference system of the photoelectric measuring device. After the alignment of the $x$ and $y$ coordinates, the register marks associated with the $\psi$-coordinate are reproduced on the reference system for the $x$-coordinate or $y$-coordinate and aligned there. Thus it is possible to align two lined sheets in relation to one another with only a single double-coordinate measuring system.

The alignment in the three coordinates $x$, $y$ and $\psi$ is carried out by means of a photoelectric measuring device which is constructed in accordance with the known dual-image or split-filed microscopes. In this case, the images of two objectives disposed side by side are superimposed on one another. Accordingly, it is proposed that one objective should be placed at the position of the $x$, $y$ mark and another at the position of the $\psi$ mark, and the reference system brought into the superimposed image plane. It is then possible to switch over alternately to the two measuring points by means of the illumination or by means of diaphragms.

The register marks are preferably produced on the semiconductor wafer in a masking process which is not aligned automatically.

Since only relatively few photoelectric measuring device are needed for the method according to the invention, the equipment necessary for full automatic alignment could be made considerably more simple and less expensive.

In various cases, particularly during the projection masking of one sheet on another sheet by photo-optical image-forming with an objective, by electron-optical image-forming or by shadow projection, it cannot be absolutely assumed that the image-formation will be effected on the precise scale required. In order to overcome this disadvantage, in a method for the automatic alignment of two structures which are reproduced one on top of the other and have to be brought into register with one another, by means of photoelectric or electron-sensitive measuring devices, it is proposed according to the invention that register marks should be provided in both structures by means of which the required scale of reproduction between the two structures or the plane parallelism of the areas containing the structures to be brought into register with one another is adjusted. The method according to the invention may be used to particular advantage when the register marks associated with one another in the two structures provided, for example, on articles in the form of sheet, are detected and aligned in relation to one another by means of the same optical measuring system.

Thus in the method according to the invention, the two sheets are aligned in relation to one another with respect to the defined cartesian coordinates $x$, $y$ and $z$ and the angle of rotation $\psi$. In this case, at least one register mark must be provided on each sheet for each of the four coordinates.

The method according to the invention is realized in particular by register marks in the form of lines or strips being provided on the sheets for the adjustment in the direction of the $x$, $y$ and $\psi$ coordinates. Extending parallel to at least one of said three register marks on each sheet, at a specific distance therefrom, are a further four separate register marks. By means of the defined spacing between the two register marks extending parallel to one another on both sheets, the required scale of reproduction $\beta$ between the two sheets can be adjusted precisely. It is immaterial what the absolute value of $\beta$ is. In the simplest case, $\beta = 1$. Only as a result of this precise adjustment of the scale of reproduction is assurance provided, in said reproduction method, that when the coordinates $x$, $y$ and $\psi$ are brought into register at one point within the structures of two-dimensional extent,, all the other parts of the structures are in register with one another.

Figure 13:
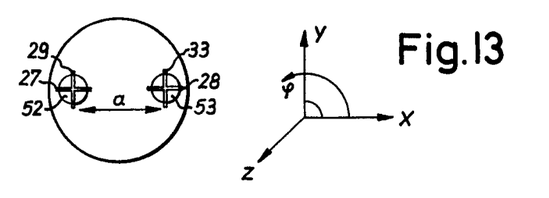
FIG. 13 shows a different arrangement of register marks.

FIG. 13 illustrates one embodiment of the four register marks on one of the two sheets to be brought into register with one another. The mark 29 serves, for example, for the register in the x-direction while the mark 27 is used for the registration in the y-direction. Said two marks 27 and 29 are arranged one above the other in the form of a cross in the example illustrated in FIG. 13. At a base distance $a$ from the first register mark cross, which is sufficient for the measuring accuracy, there is a further register-mark cross composed of the register marks 28 and 33 disposed perpendicular to one another as shown in FIG. 13. The two register marks in the form of lines or strips corresponding to one another extend in the same directions in the two crosses. The register mark 28 serves to adjust the precise angle of rotation in relation to the other sheet while the register mark 33, in conjunction with the register mark 29, is used to adjust the scale of reproduction $\beta$. In order that the scale of reproduction between the two sheets to be brought into register with one another may be precise, the distance $a$ between the two register marks 29 and 33 must coincide with the corresponding distance $a$ on the second sheet. In practice, the marks 33 on the two sheets are brought into register with one another, at the same time checking the existing register of the marks 29, by varying the scale of reproduction by variation in the z-height position of one sheet or of the objective. If the mark 29 is situated in the optical axis of the reproduction system, its simultaneous checking during the alignment of the mark 33 can be omitted.

The arrangement of the register marks in the form of a cross in FIG. 13 represents a specific example of an embodiment of the mark arrangement necessary for the method according to the invention. The individual register marks, may, of course, also be accommodated separately from one another in different image fields on the two wafers. With the arrangement of the register marks in the form of a cross, both marks of a cross may be detected by means of the same photoelectric measuring system and be aligned in relation to one another, in which case the reference system preferably contains two sensor systems perpendicular to one another.

Figure 15:
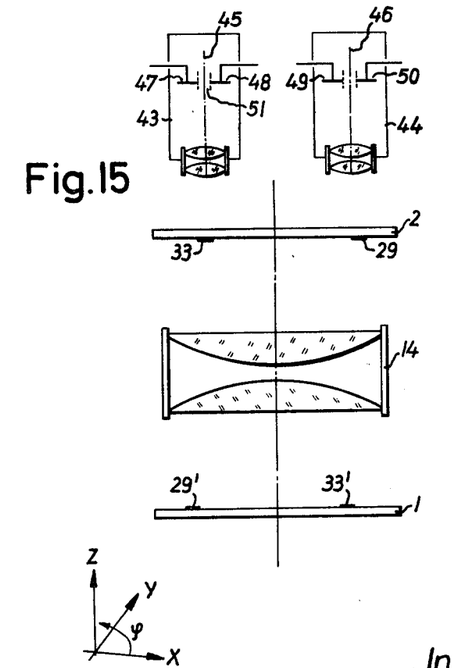
FIG. 15 shows diagrammatically a further form of automatic registering device in accordance with the invention.

As an aid to understanding, the register device needed at the points 52 and 53 will be explained in more detail in FIG. 15. The two sheets 1 and 2 which are to be brought into register with one another and which consist for example of a semiconductor wafer and a mask bear the register marks 29 and 33 or 29' and 33' respectively. They are reproduced one on the other by means of the objective 14. By means of the photoelectric measuring device 43, the two marks 33 and 33' are aligned simultaneously or successively on the reference plane 45 of the photoelectric measuring device 43, for example by adjusting both sheets 1 and 2 in relation to the axis 45 by displacement in the x-direction. Subsequently or simultaneously, the photoelectric measuring device 44 is likewise adjusted with its axis 46 on the mark 29, and the mark 29' is likewise adjusted to the axis 46 of the photoelectric measuring device 44 by z-vertical movement of the seet 1. The reference systems may, for example, consists of a divided sensor in which case, the sensor is composed of a photodiode with the component areas 47 and 48 or 49 and 50 respectively. The two component areas are separated from one another by a fine gap 51. The electronic system connected to the component diodes regulates the movement of the sheets in such a manner that the register marks are reproduced symmetrically in relation to the gap between the partial diodes. For the simultaneous registering of the masks 27 and 29 or 28 and 33 situated perpendicular to one another, the photodiode is similarly divided into four component diodes which are separated from one another by two fine gaps arranged in the form of a cross.

The reference systems 47/48 and 49/50 in the measuring systems 43 and 44 may naturally also consist of the arrangement 18/19 with prismatic mirror 17 shown by way of example in FIG. 6 or similar arrangements. The arrangement of divided photodiodes may also be used instead of the arrangement 17/18/19 in the example in FIG. 6.

In the example of an embodiment described so far it is possible to align the two sheets to be brought into register with one another, completely in relation to one another in the $x$, $y$, $\psi$ and $z$ directions, if the two sheets are guided plane parallel or perpendicular to the optical axis of the image-forming system. This may be effected by means of an appropriately adjusted mechanical device.

Figure 14:
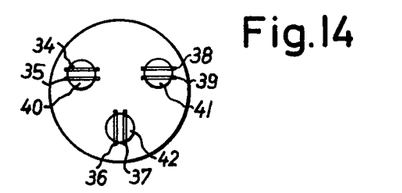
FIG. 14 shows a further arrangement of register marks.

It is also possible, however, to use the method described simultaneously for the plane-parallel alignment, or for the alignment in the optical image plane or for adjusting the scale of reproduction between the two sheets. In this case, as shown in FIG. 14, the register marks for the z-height position of the three image fields 40, 41 and 42 are adjusted separately to their associated marks in the other sheet by bringing the pairs of lines 34/35, 36/37, and 38/39 into register. In the course of this, the one lined sheet is wobbled so that it is then arranged plane parallel, or aligned in the optimum optical manner in relation to the other lined sheet. In this case, the register marks 34, 36 and 39 serve, in addition for the alignment in the cartesian coordinate directions $x$, $y$ and in the $\psi$-direction of rotation. In this case, one pair of measuring systems 43/44 is necessary for each of the three positions 40, 41, 42. Simplfication is possible by two reference systems 47/48 and 49/50 being combined with adjustable spacing in an optimum measuring system.

Although the invention has been explained so far with reference to examples of embodiments with photo-optical reproduction of one lined sheet on the other, it is not restricted to this use. It may likewise be applied in a similar manner to an electron-optical reproduction of a pattern on a sheet already provided with a pattern, and to the reproduction, by means of shadow projection, with any desired wavelength. In the electron-optical application, it may either be a question of an electron-optical reproduction of a concrete pattern by means of one or more electron-optical lenses, in which case the scale of reproduction is varied by the energizing currents of magnetic lens fields or by the voltage of electro-optical lenses, or it may be a question or producing a pattern by means of microrecorders. In this case, the pattern is drawn by deflection of a focused electron beam. The deflection may be effected in the form of a raster or by programmed control through a computer. The scale of reproduction is varied by extending the raster or the programme coordinates. In the electron-optical application, the signal needed for the alignment is obtained, for example, from the secondary emission of the second pattern projected on to the first pattern.

It will be understood that the above description of the present invention is susceptible to various modifications, changes and adaptations.

What is claimed is:

1. A method for the automatic alignment of two sheets provided with structures to be brought into register with one another comprising the steps of: forming an associated register mark on each sheet; detecting said register marks associated with one another on both said sheets by means of a single optical measuring system including photoelectric means; altering the position of either of said sheets with respect to the other said sheet in response to the output of said photoelectric means; reproducing said register marks in said sheets in the entry plane of a reference system of a photoelectric device of said photoelectric means; producing an output signal, which corresponds to the relative position of said register marks in relation to the reference axis or plane of said reference system, from the output of said photoelectric device; and using said output signal to control a regulating device which controls the altering of the position of either of said sheets with respect to the other said sheet.

2. A method as defined in claim 1, wherein said register mark on each sheet serves for alignment of said sheets with respect to each of two cartesian coordinates $x$ and $y$ at right angles to each other and an angle of rotation $\psi$ in the same plane as said cartesian coordinates.

3. A method as defined in claim 2, further comprising using a coordinate system in which the axis of the two cartesian coordinates entered through the center about which the angle of rotation is taken.

4. A method as defined in claim 2, further comprising aligning said sheets in the direction of said two cartesian coordinates and said angle of rotation by means of a photo-electric device for each coordinate.

5. A method as defined in claim 3, further comprising aligning said sheets in the direction of a third cartesion coordinate at right angles to said two cartesion coordinates for adjusting the scale of respoduction between said sheets.

6. A method as defined in claim 5, wherein said aligning in said direction of said third cartesion coordinate is carried out by displacement of one of said sheets.

7. A method as defined in claim 5, wherein said aligning in said third cartesion coordinate is carried out by displacement of an image forming objective which serves to form the image of said sheets.

8. A method as defined in claim 1, further comprising using different wavelengths of light for the reproduction of each of said register marks.

9. A method as defined in claim 1, further comprising using different wavelength ranges of light for the reproduction of each of said register marks.

10. A method as defined in claim 1, further comprising dividing the light beam, reproducing said register marks in said entry plane at said entry plane and sensing the divided beam separately.

11. A method as defined in claim 1, wherein one of said two articles is a semiconductor wafer which is provided with structures and register marks on the surface and the other of said articles is a mask provided with structures.

12. A method as defined in claim 11, further comprising contact printing said mask on to said semiconductor wafer.

13. A method as defined in claim 2, further comprising forming register marks in the two sheets by means of which the scale of reproduction B between said structures on said sheets is adjusted 14. A method as defined in claim 13, wherein said register mark for aligning the scale of reproduction $\beta$ is a line parallel to one of the register marks of the cartesian coordinates and situated at the position of the register mark for alignment of the angle of rotation $\psi$, resulting in an arrangement of two crosses for the alignment of the two cartesian coordinates $x$ and $y$, the angle of rotation $\psi$ and the scale of reproduction $\beta$.

15. A method as defined in claim 2, further comprising the detection and alignment of the register marks of two different coordinates with a single optical measuring system, reproducing the register marks on the entry plane of a two-coordinate photo-electric device.

16. A method as defined in claim 15, further comprising the application of a pyramid mirror for splitting the entering beam into two perpendicular beam pairs for each of the coordinates.

17. A method for the automatic alignment of two sheets provided with structures to be brought into register with one another comprising the steps of: forming an associated register mark on each sheet; detecting said register marks associated with one another on both said sheets by means of a single optical measuring system including photoelectric means; altering the position of either of said sheets with respect to the other said sheet in response to the output of said photoelectric means; reproducing said register marks on said reference system of said photoelectric measuring device and aligning said reproduced marks in relation to said reference axis or plane of said reference system.

18. A method as defined in claim 17, further comprising reproducing said register marks simultaneously on said reference system.

19. A method as defined in claim 17, further comprising reproducing said register marks one after the other on said reference system.

20. A method as defined in claim 19, further comprising at least partially compressing the reproduction of one said register mark by reduction of its effective intensity while aligning the other said register mark.

21. A method as defined in claim 20, further comprising reproducing one said register mark bright against a dark background and the other said register mark dark against a light background.

22. A method as defined in claim 17, further comprising aligning said register marks so that they are reproduced simultaneously on said reference axis or plane.

23. A method as defined in claim 17, wherein said register mark on one said sheet is displaced in position from said associated register mark on the other said sheet in respect to the aligned position of both sheets, further comprising aligning one said sheet by means of said photoelectric device, displacing said photo-electric device by a distance to take into account the displacement of said register marks between said sheets and thereafter aligning the other said sheet.

24. A method as defined in claim 17, wherein said register mark on one said sheet is displaced in position from said associated register mark on the other said sheet, further comprising aligning one said sheet by means of said photoelectric device, displacing said reference system of said photoelectric device by a distance to take into account the displacement of said register marks between said sheets and thereafter aligning the other said sheet.

25. A method as defined in claim 17, further comprising using a register mark on one sheet which is covered by the register mark of the other sheet and therefore does not significantly affect the alignment of the other said register mark when said register marks are in alignment.

26. A method as defined in claim 18, wherein the extension of said register marks on said sheets is different in the direction of displacement during alignment of said register marks in respect to each other.

27. A method for the automatic alignment of two sheets provided with structures to be brought into register with one another comprising the steps of: forming an associated register mark on each sheet such that said register marks are displaced in position from one another in respect to the aligned position of both sheets; detecting said register marks associated with one another on both said sheets by means of a single optical measuring system including photoelectric means; altering the position of either of said sheets with respect to the other said sheet in response to the output of said photoelectric means; reproducing one register mark on a first reference system of said photoelectric device; aligning said reproduced one register mark with the reference axis or plane of said first reference system; reproducing the other register mark on a second reference system of said photoelectric device situated optically side by side with said first reference system at a distance to take into account the displacement of both said register marks; and aligning said reproduced other register mark with the reference axis or plane of said second reference system.

28. A method for the automatic alignment of two sheets provided with structures to be brought into register with one another comprising the steps of: forming associated register marks on each sheet as a plurality of narrow parallel or meshed lines situated close beside one another; detecting said register marks associated with one another on both said sheets by means of a single optical measuring system including photoelectric means; and altering the position of either of said sheets with respect to the other said sheet in response to the output of said photoelectric means.

29. A method for the automatic alignment of two sheets provided with structures to be brought into register with one another comprising the steps of: forming an associated register mark on each sheet by means of which the plane parallelism of the areas containing said structures on said sheets is adjusted; detecting said register marks associated with one another on both said sheets by means of a single optical measuring system including photoelectric means; and altering the position of either of said sheets with respect to the other said sheet in response to the output of said photoelectric means.

30. A method for the automatic alignment of two sheets provided with structures to be brought into register with one another comprising the steps of: forming an associated register mark on each sheet by means of which the scale of reproduction between said structures on said sheets and the plane parallelism of the areas containing said structures on said sheets is adjusted; detecting said register marks associated with one another on both said sheets by means of a single optical measuring system including photoelectric means; and altering the position of either of said sheets with respect to the other said sheet in response to the output of said photoelectric means.

31. A method for the automatic alignment of a semiconductor wafer which is provided with structures on the surface and a mask to be brought into register with one another, comprising the steps of: forming an associated register mark on both said semiconductor wafer and said mask; detecting said register marks associated with one another on said semiconductor wafer and said mask by means of a single optical measuring system including photoelectric means, said step of detecting being carried out by imaging said register marks onto an entry plane of said optical measuring system by a wavelength range forming an image on said entry plane by interference contrast due to light interferences in the illuminated register marks; and altering the relative positions of said semiconductor wafer and said mask in response to the output of said photoelectric means.

32. A method as defined in claim 31, wherein said register marks consist of several lines, and wherein the image contrast of the entire register marks is formed by addition of the interference contrast at the edges of each of said several lines.

33. A method for the automatic alignment of a semiconductor wafer which is provided with structures on the surface and a mask to be brought into register with one another, comprising the steps of: forming an associated register mark on both said semiconductor wafer and said mask; detecting said register marks associated with one another on said semiconductor wafer and said mask by means of a single optical measuring system including photoelectric means; altering the relative positions of said semiconductor wafer and said mask in response to the output of said photoelectric means; reproducing said mask in said semiconductor wafer by projection and reproducing said semiconductor surface in the reverse path by the projection rays in the plane of the mask and reproducing said semiconductor surface and said mask on a reference system of said photoelectric means.

34. A method for the automatic alignment of a semiconductor wafer which is provided with structures on the surface and a mask to be brought into register with one another, comprising the steps of: forming an associated register mark on both said semiconductor wafer and said mask; detecting said register marks associated with one another on said semiconductor wafer and said mask by means of a single optical measuring system including photoelectric means; and altering the relative positions of said semiconductor wafer and said mask in response to the output of said photoelectric means, wherein said register marks on the semiconductor wafer, consist of thickness steps or windows in an insulating layer on top of the semiconductor surface or of steps or areas of different reflection on the semiconductor surface itself.

* * * * *

UNITED STATES PATENT OFFICE
CERTIFICATE OF CORRECTION

Patent No. 3,712,740          Dated January 23rd, 1973

Inventor(s) Klaus Hennings

It is certified that error appears in the above-identified patent and that said Letters Patent are hereby corrected as shown below:

In the heading of the patent, after line 10, insert the following --October 17, 1969 Germany.......... P 19 52 273.7--. Column 2, line 16, change "Jective" to --jective--; line 53, change "competent" to --component--; line 60, change "lines" to --lined--. Column 5, line 14, change "of" to --or--; line 61, change "mark" to --marks--. Column 6, line 15, delete "same"; line 18, change "of" to --or--. Column 7, line 35, change "takes" to --take--. Column 8, line 9, after "The" insert --register mark--; line 10, delete "register mark"; line 33, change "positive a" to --a positive--. Column 9, line 65, change "FIg" to --FIG--. Column 10, line 18, after "second" insert --mark--; line 49, insert a dash (-) after "FIG. 6". Column 14, line 33, change "split-filed" to --split-field--. Column 18, line 5, change "3" to --2--; line 38, change "B" to --β--.

Signed and sealed this 29th day of May 1973.

(SEAL)
Attest:

EDWARD M. FLETCHER, JR.
Attesting Officer

ROBERT GOTTSCHALK
Commissioner of Patents